US 6,735,676 B1

(12) United States Patent
Kanda et al.

(10) Patent No.: US 6,735,676 B1
(45) Date of Patent: May 11, 2004

(54) METHOD AND SYSTEM FOR SHARING STORING DEVICE VIA MUTUALLY DIFFERENT INTERFACES

(75) Inventors: Motohiro Kanda, Yokohama (JP); Akira Yamamoto, Sagamihara (JP); Akinobu Shimada, Odawara (JP)

(73) Assignee: Hitachi, Ltd., Tokyo (JP)

( * ) Notice: Subject to any disclaimer, the term of this patent is extended or adjusted under 35 U.S.C. 154(b) by 833 days.

(21) Appl. No.: 09/621,696

(22) Filed: Jul. 21, 2000

Related U.S. Application Data (63) Continuation of application No. 08/912,872, filed on Aug. 19, 1997, now Pat. No. 6,115,797.

(51) Int. Cl.[7] .................................................. G06F 12/16
(52) U.S. Cl. ....................................................... 711/147
(58) Field of Search ................................ 711/147, 112, 711/149, 162, 114, 153

(56) References Cited

U.S. PATENT DOCUMENTS

| | | | | |
|---|---|---|---|---|
| 5,485,579 A | * | 1/1996 | Hitz et al. .................. 709/221 |
| 5,581,743 A | | 12/1996 | Burton et al. .......... 395/500.47 |
| 5,664,144 A | | 9/1997 | Yanai et al. ................. 711/113 |
| 5,724,542 A | | 3/1998 | Taroda et al. ............... 711/113 |
| 5,920,893 A | * | 7/1999 | Nakayama et al. ......... 711/147 |
| 5,983,317 A | * | 11/1999 | Kanda et al. ............... 711/112 |
| 6,041,391 A | * | 3/2000 | Kanda et al. ............... 711/112 |
| 6,275,910 B1 | * | 8/2001 | Kanda et al. ............... 711/147 |
| 6,425,050 B1 | * | 7/2002 | Beardsley et al. .......... 711/113 |
| 6,438,646 B1 | * | 8/2002 | Kitamura et al. ........... 711/112 |
| 6,598,129 B2 | * | 7/2003 | Kanda et al. ............... 711/147 |
| 6,606,690 B2 | * | 8/2003 | Padovano ................... 711/148 |
| 6,654,830 B1 | * | 11/2003 | Taylor et al. ................. 710/74 |

FOREIGN PATENT DOCUMENTS

JP 1306917 12/1998

* cited by examiner

Primary Examiner—David Hudspeth
Assistant Examiner—Fred F. Tzeng
(74) Attorney, Agent, or Firm—Antonelli, Terry, Stout & Kraus, LLP (57) ABSTRACT

A first computer having a first interface connected to a backup storage device, and a second computer having a second interface differing in format from the first interface share a common storage device which can be connected to either the first interface or the second interface. The first and second computers are connected to the shared storage device via a storage device controller. In response to a data access command issued to the shared storage device by either the first computer or the second computer, the storage device controller converts a data address specified by the data access command to a data address used within the shared storage device. By using the data address obtained by the conversion, the shared storage device is accessed. The first computer creates, in the backup storage device, a backup of data stored in the shared storage device via the storage device controller.

4 Claims, 9 Drawing Sheets

METHOD AND SYSTEM FOR SHARING STORING DEVICE VIA MUTUALLY DIFFERENT INTERFACES

This is a continuation of application Ser. No. 08/912,872 U.S. Pat. No. 6,115,797, filed Aug. 19, 1997.

BACKGROUND OF THE INVENTION

The present invention relates to a computer system formed by a plurality of computers, and in particular to a method, and system, for allowing a plurality of computer systems to share the same storage device via mutually different interfaces.

In recent years, so-called downsizing is extensively conducted in the field of computer system. The business performed by mainframes in the past has recently been processed by open systems formed by personal computers and work stations.

It is now assumed that a computer is to access a disk device. Traditionally in mainframes, access to the disk device is conducted via an interface standardized so as to transfer a data record of count-key-data record format according to specification of a cylinder number, a header number and a record number (CCHHR). On the other hand, in open systems, access to the disk is conducted via an interface standardized so as to transfer a data block of fixed-sized block data record format according to specification of a logic block address (LBA).

This results in a problem that a disk device generally used in the mainframe cannot be accessed in the open system, and on the contrary, a disk device used in the open system cannot be accessed in the mainframe. Other storage devices such as a magnetic tape device cannot be shared between the mainframe and the open system, either.

Therefore, the user which makes the mainframe and the open system operate in parallel needs to produce individual backups of data respectively in the mainframe and the open system, store the backup data thus produced in separate storage media, and manage them. However, this is a heavy burden on the user's operation. Since the open system is often added to an existing system including a mainframe, it is desirable to be able to backup data of the open system in a magnetic tape device or the like of the mainframe.

In "Data sharing unites mainframes with open systems," David Simpson, Datamation, February 1977, and "Networked storage speeds data access," Tim Quellette, Computerworld, Inc., November 1996, data sharing between mainframes and open systems is proposed, but concrete configurations for realizing it are not disclosed.

SUMMARY OF THE INVENTION

An object of the present invention is to provide a method, and system, for sharing storage devices such as disk devices among a plurality of computers respectively having different interfaces.

Another object of the present invention is to backup data of the open system on the mainframe side.

In accordance with the present invention, a method, whereby a first computer having an interface for accessing a data record of count-key-data format by specifying a CCHHR as an address and a second computer having an interface for accessing a data block of fixed-sized block record format by specifying a LBA as an address share a storage device via a storage device controller, includes making the shared storage device accessible with the CCHHR, creating predetermined dataset management information, and initializing data records of a data part in the count-key-data format, from the first computer; in response to a data block write request issued by the second computer, deriving the CCHHR of the data record included in the data part and mapped from the specified LBA with one-to-one correspondence, deriving a byte position with respect to head of the data record, and writing the data block onto the shared storage device; and in response to a data record read request issued by the first computer, reading a data record specified by a CCHHR from the shared storage device, and transferring the data record to the first computer.

Furthermore, in accordance with the present invention, the method for sharing a storage device via mutually different interfaces includes, in response to a data block write request issued by the second computer, writing a data block specified by a LBA onto the shared storage device, in response to a data record read request specifying a predetermined CCHHR assigned to dataset management information issued by the first computer, generating predetermined dataset management information, and transferring the predetermined management information to the first computer, and in response to a read request of a data record assigned to a data part issued by the first computer, deriving a LBA of a data block mapped from the specified CCHHR with one-to-one correspondence, reading a data record from the shared storage device by using the LBA, adding a generated predetermined count part to the data record thus read, and transferring resultant data to the first computer.

Furthermore, in accordance with the present invention, the method for sharing a storage device via mutually different interfaces includes, in response to a data record write request specifying a predetermined CCHHR assigned to dataset management device information issued by the first computer, converting the specified CCHHR to a LBA located outside an access range of the second computer and writing a data record of the dataset management information onto the shared storage device, in response to a data block write request issued by the second computer, writing a data block specified by a LBA onto the shared storage device, in response to a data record read request specifying a predetermined CCHHR assigned to dataset management information issued by the first computer, converting the specified CCHHR to a LBA and read predetermined dataset management information by using the LBA, adding a generated predetermined count unit to a data record of the dataset management information thus read and transferring resultant data to the first computer, and in response to a data record read request specifying a CCHHR assigned to a data part excepting dataset management information issued by the first computer, deriving a LBA of a data block mapped from the specified CCHHR with one-to-one correspondence, reading a data record from the shared storage device by using the LBA, adding a generated predetermined count part to the data record thus read, and transferring resultant data to the first computer.

Furthermore, in accordance with the present invention, the data record transferred from the shared storage device to the first computer as described above is written onto a separate storage device via the first computer, and whereby a backup of data on the shared storage device is created.

Owing to the present invention, the shared storage device can be accessed by both the open system and the main frame by using the conventional interface. In addition, data of the open system can be backed up on the main frame side owing to the present invention.

DESCRIPTION OF THE PREFERRED EMBODIMENTS

Hereafter, embodiments of the present invention will be described in detail by referring to drawings.

Figure 1:
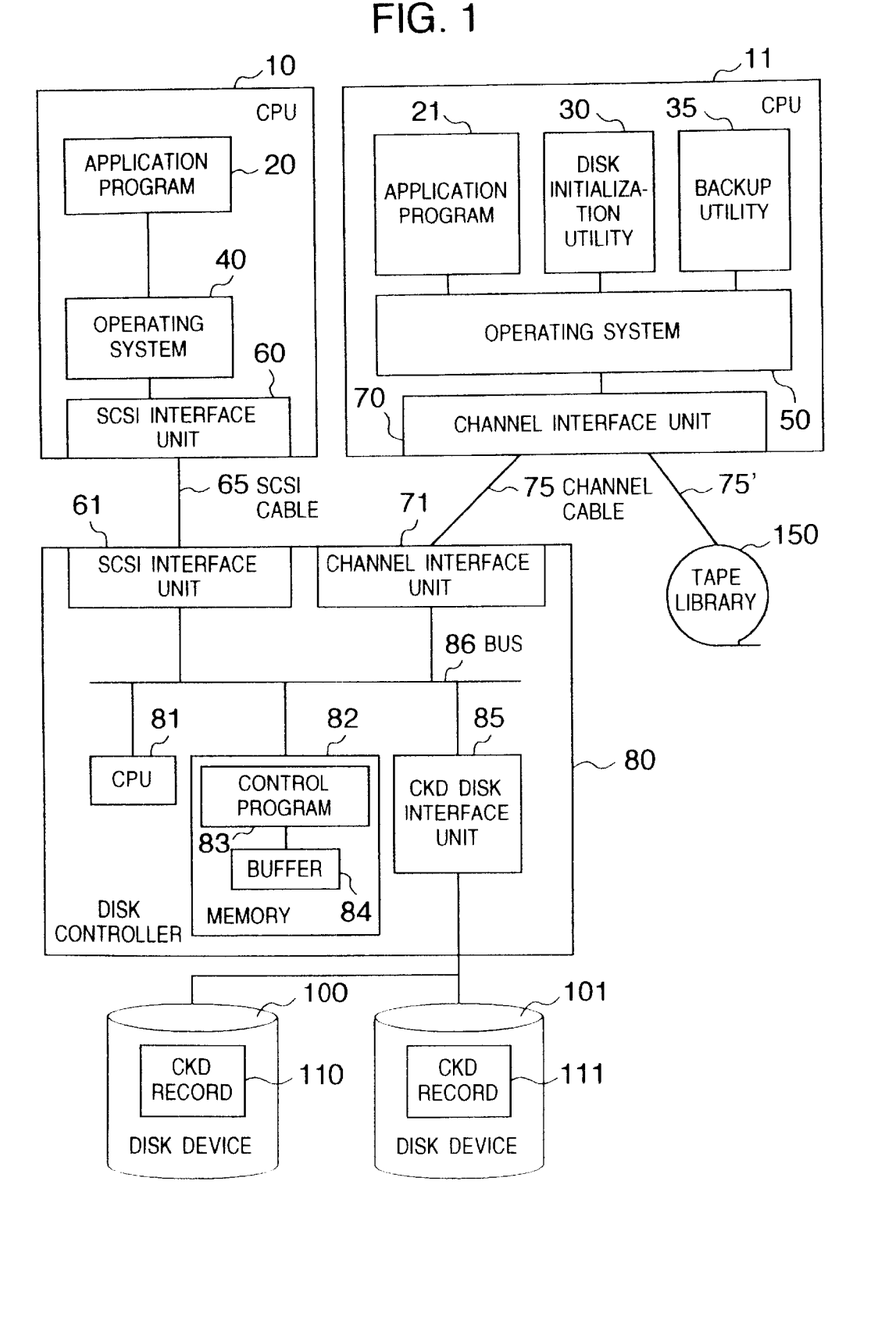
FIG. 1 is a configuration diagram of a computer system of a first embodiment.

FIG. 1 is a configuration diagram of a computer system of a first embodiment. A CPU 10 is a computer belonging to an open system which has a SCSI (Small Computer System Interface) interface unit 60. An operating system 40 is an OS of, for example, UNIX (where UNIX is a trademark of X/Open Company Limited in U.S. and other countries), and controls the CPU 10. A SCSI interface unit 60 is hardware including a connector for connection to a SCSI cable 65 and a circuit for conducting data transfer according to the SCSI. An application program 20 is a program for accessing a disk device of fixed-sized block data record format via the operating system 40 and the SCSI interface unit 60.

A CPU 11 is a mainframe computer including a channel interface unit 70. An operating system 50 is an OS of, for example, VOS3 (Virtual-storage Operating System 3) produced by Hitachi, Ltd. and controls the CPU 11. A channel interface unit 70 is hardware including a connector for connection to a channel cable 75 and a circuit for conducting data transfer according to the channel interface.

An application program 21 is a program for accessing a disk device of count-key-data record format via the operating system 50 and the channel interface unit 70. A disk initialization utility 30 and a backup utility 35 will be described later.

Hereafter, the count-key-data record format is referred to as CKD format and the fixed-sized block data record format is referred to as FBA (Fixed Block Architecture) format. A record of CKD format is referred to as CKD record. A record of FBA format is referred to as FBA record.

A disk controller 80 is a controller connected to the CPU 10 and the CPU 11 via the SCSI cable 65 and the channel cable 75, respectively. The disk controller 80 includes a SCSI interface unit 61, a channel interface unit 71, a CPU 81, a memory 82, a CKD disk interface unit 85, and a bus 86 for mutually connecting these mechanisms.

The SCSI interface unit 61 is hardware including a connector for connection to a SCSI cable 65 and a circuit for conducting data transfer with the bus 86 according to the SCSI. The channel interface unit 71 is hardware including a connector for connection to the channel cable 75 and a circuit for conducting data transfer with the bus 86 according to the channel interface. The memory 82 is an internal memory for storing a control program 83 and data of a buffer 84. The CKD disk interface unit 85 is hardware for conducting data transfer between disk devices 100 and 101 and the bus 86. The CPU 81 is a processor for controlling the entire disk controller 80 by executing the control program 83.

The disk devices 100 and 101 are disk devices connected to the CKD disk interface unit 85 of the disk controller 80. The disk device 100 stores CKD records 110. The disk device 100 is a disk device shared by the CPUs 10 and 11. The disk device 101 stores CKD records 111. The disk device 101 is a disk device accessed by the CPU 11 alone.

A tape library 150 is connected to the CPU 11 via the channel cable 75. The tape library 150 is formed by a tape controller, a tape driver and a plurality of reels of tape, which are not illustrated.

Via the operating system 40, the SCSI interface unit 60, the SCSI interface unit 61, the control program 83, and the CKD disk interface unit 85, the application program 20 writes a CKD record 110 onto the disk device 100. At this time, the control program 83 converts a record of FBA format sent from the CPU 10 to a record of CKD format, and then writes the record of CKD format into the disk device 100. When the application program 20 reads a CKD record 110 existing on the disk device 100 via the same mechanism units, the control program 83 extracts only specified data out of the CKD record read from the disk device 100 and sends the specified data to the CPU 10.

The application program 21 writes a CKD record 111 onto the disk device 101 via the operating system 50, the channel interface unit 70, the channel interface unit 71, the control program 83, and the CKD disk interface unit 85, and reads a CKD record 111 existing on the disk device 101 via the same mechanism units. Its control scheme is the same as that in the case where the conventional mainframe accesses a disk device via a channel interface and reads/writes a CKD record.

Via the operating system 50, the channel interface unit 70, the channel interface unit 71, the control program 83, and the CKD disk interface unit 85, the disk initialization utility 30 creates, on the disk device 100, dataset management information which can be recognized by the operating system 50 of the CPU 11, and initializes the disk device 100 with the CKD format. At this time, the disk initialization utility 30 initializes the CKD records so as to have such a format as to be suitable for storing data blocks of FBA format sent from the CPU 10 as well.

The backup utility 35 reads a record existing on the disk device 100 via the operating system 50, the channel interface unit 70, the channel interface unit 71, the control program 83, and the CKD disk interface unit 85, and writes the record thus read onto tape of the tape library 150 to create backup data. The backup utility 35 can also read a block existing on the tape library 150 and write it onto the disk device 100 to restore the backup data.

Figure 2:
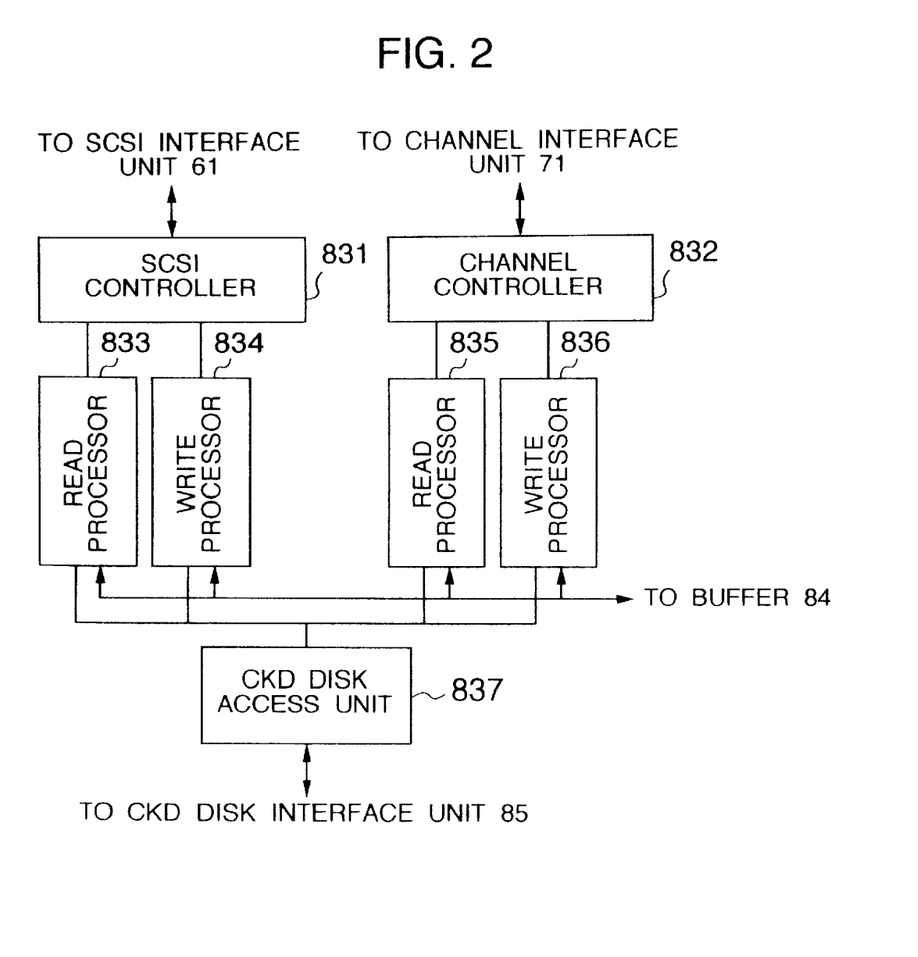
FIG. 2 is a more detailed configuration diagram of a control program 83 of the first embodiment.

FIG. 2 is a more detailed configuration diagram of the control program 83. A SCSI controller 831 is a controller for interpreting a command inputted via the SCSI interface unit 61, delivering the control to a read processor 833 or a write processor 834, and controlling the data transfer between the SCSI interface unit 61 and the buffer 84. A CKD disk access unit 837 is a controller for driving the CKD disk interface unit 85 to access the disk device 100 or the disk device 101.

When a read command is inputted from the CPU 10, the read processor 833 is driven and converts a block address (LBA) sent from the CPU 10 to a record address (CCHHR) of CKD format. And the read processor 833 reads a CKD record from the disk device 100 via the CKD disk access unit 837 into the buffer 84, and transfers only the data portion specified by the read command toward the CPU 10.

When a write command is inputted from the CPU 10, the write processor 834 is driven and converts a block address (LBA) sent from the CPU 10 to a record address (CCHHR) of CKD format. By using that CCHHR, the write processor 834 reads a CKD record from the disk device 100. Subsequently, the write processor 834 overwrites a data block sent from the CPU 10 on a CKD record existing on the buffer 84, and drives the CKD disk access unit 837 to write the CKD record existing on the buffer 84 into the disk device 100.

A channel controller 832 is a controller for interpreting a command inputted from the CPU 11 via the channel interface unit 71, delivering the control to a read processor 835 or a write processor 836, and controlling the data transfer between the channel interface unit 71 and the buffer 84. The read processor 835 and the write processor 836 conduct conventional CKD record reading/writing via the buffer 84 and the CKD disk access unit 837.

In the case of data transfer between the application program 20 and the disk device 100, the SCSI controller 831, the read processor 833 and the write processor 834 are executed. In the case of data transfer between the application program 21 and the disk device 101, and data transfer between the disk initialization utility 30/the backup utility 35 and the disk device 100, the channel controller 832, the read controller 835 and the write processor 836 are executed. The record address of CKD format sent via the channel interface unit 71 is represented in the format of a cylinder number (CC), a header number (HH) and a record number (R). Hereafter, the record address of this CKD format is called CCHHR. The block address of FBA format sent via the SCSI interface unit 61 is specified by a LBA (Logical Block Address).

Figure 3:
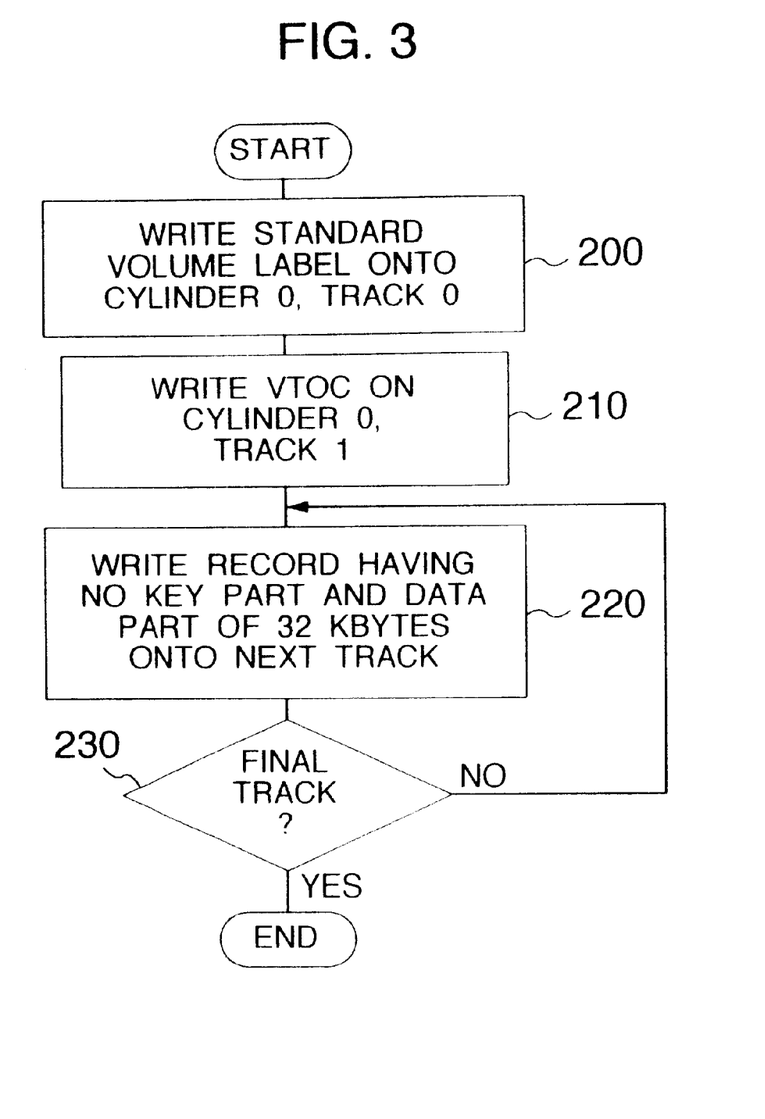
FIG. 3 is a flow chart showing the flow of disk initialization processing of the first embodiment.

FIG. 3 is a flow chart showing the flow of initialization processing of the disk device 100 conducted by the disk initialization utility 30. The disk initialization utility 30 writes a standard volume label onto cylinder 0, track 0 of the disk device 100 via the write processor 836 (step 200). The standard volume label includes a volume name for example, "A1VOL" and CCHHR of a VTOC (Volume Table Of Contents). The contents of the standard volume label indicate that the VTOC exists on cylinder 0, track 1.

Subsequently, the VTOC is written onto cylinder 0, track 1 (step 210). Contents of the VTOC at the time of initialization indicate that one sequential dataset having a size equivalent to the full capacity of the volume (the disk device 100 in this case) exists in the volume, and there are not free areas in the volume, and indicate that the sequential dataset is formed by a plurality of records of fixed sized nonblocked record format each having a record length of 32 Kbytes.

The record length of 32 Kbytes originates in the fact that the data length of the data blocks of FBA format was set equal to 512 bytes. Because the record length needs to be set equal to a multiple of 512 bytes for putting data blocks of FBA format having 512 bytes in one record of CKD format without a remainder.

The standard volume level and the VTOC thus created are dataset management information which can be recognized by the operating system 50. Subsequently, one record having no key parts and having a data part of 32 Kbytes is written on the next track (cylinder 0, track at least 2) as record 1 (step 220). As for the data part, initialization data (for example, such as all "0"s) are written. Subsequently, it is determined whether the track is the final track of the disk device 100 (step 230). If the track is not the final track (NO of step 230), a return to step 220 is effected and the above described processing is continued. If the track is the final track (YES of step 230), the processing is finished.

Figure 4:
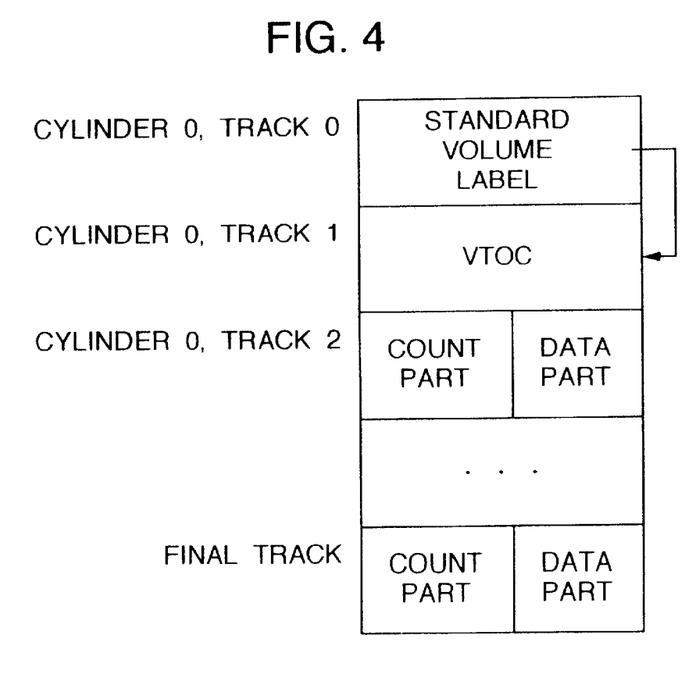
FIG. 4 is a diagram showing the data format of a disk device 100 of the first embodiment after the disk initialization processing.

FIG. 4 is a diagram showing the data format of the disk device 100 after the disk initialization processing. The data part of the cylinder 0, track 2 and larger than 2 is an area onto which the data block sent from the CPU 10 is written. Into that area, data generated by application program 20 are written. The data record part on each track has a size of 32 Kbytes (32,768 bytes). Since control information of a count part and the like is stored on each track, however, the storage capacity of the whole track becomes larger than this value. In the present embodiment, the data length of a data block of FBA format sent from the CPU 10 is set equal to 512 bytes. In one data record in the disk device 100, therefore, 64 data blocks are housed.

Figure 5:
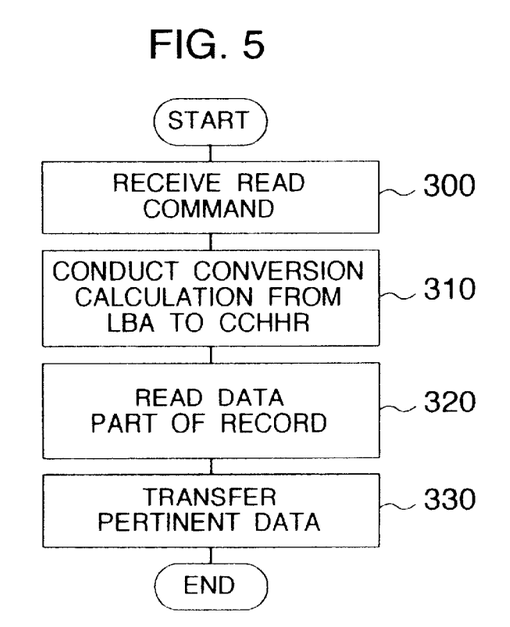
FIG. 5 is a flow chart showing the flow of SCSI read processing of the first embodiment conducted by a read processor 833.

FIG. 5 is a flow chart showing the flow of SCSI read processing conducted by the read processor 833 of the disk controller 80. The read processor 833 receives a read command from the operating system 40 via the SCSI controller 831 (step 300). From the CDB (Command Descriptor Block) of the received read command, the LBA of the data to be read is obtained, and it is converted to a CCHHR of the disk device 100 (step 310).

The conversion in the present embodiment associates the start position of the data part of the record 1 in the cylinder 0, track 2 with the head of a data block having a LBA equivalent to 0 in the CPU 10. As described above, each track stores data of 32 Kbytes. In this case, the conversion equations are as follows.

$$\text{Cylinder number} = \downarrow (\text{LBA} \times \text{block length} + 64 \text{ KB})/(\text{the number of heads} \times 32 \text{ KB}) \downarrow \quad (1)$$

$$\text{Header number} = \downarrow ((\text{LBA} \times \text{block length} + 64 \text{ KB})\% (\text{the number of heads} \times 32 \text{ KB}))/32 \text{ KB} \downarrow \quad (2)$$

Record number=1

$$\text{Byte position from head of data part} = (\text{LBA} \times \text{block length})\% 32 \text{ KB} \quad (3)$$

Here, the block length is the block length of a fixed sized block on the CPU 10 side, and it differs depending upon the disk device handled by the application program 20 and the operating program 40. In the case of the present embodiment, however, the block length is 512 bytes which is the typical value. The number of heads is the number of tracks per cylinder. The "/" is the division sign. The portion sandwiched between signs "↓" and "↓" indicate that the remainder of its calculated value is omitted and the calculated value is rounded to an integer value. The sign "%" indicates that the remainder of division is derived. It will be understood that the conversion equations map the LBA of the continuous FBA data area starting from the LBA of 0 and the byte position of 0 to the CCHHR and the byte position of the continuous data area of CKD format. It is now assumed that the number of heads is one, for example. When the LBA of the read data is 2, the conversion equation (1) yields Cylinder number=↓(2 ×512+64 KB)/(1×32 KB)↓=2, and the conversion equation (3) yields Byte position from head of data part=(2×512)% 32 KB=1024.

Subsequently, by using the conversion equation (3), the read processor 833 extracts data of one block from the record read onto the buffer 84 via the CKD disk access unit 837 and stores it in the buffer 84 (step 320). Finally, the extracted data is transferred to the CPU 10 via the SCSI interface unit 61 (step 330).

Upon receiving a write command from the operating system 40 via the SCSI controller 831, the write processor 834 stores a data block received from the CPU 10 via the SCSI interface unit 61 into the buffer 84. Thereafter, the write processor 834 converts a received LBA to a CCHHR according to the above described conversion equations, reads the pertinent data record from the disk device 100 onto the buffer 84 by using the CCHHR, and overwrites the data block already received on a predetermined portion. The write processor 834 reads the data record from the buffer 84, and writes it into the data part of the disk device 100 via the CKD disk access unit 837.

The case where the application program 20 and the operating system 40 create a file on the disk device 100 as heretofore described and thereafter a backup of the file on the disk device 100 is created in the tape library 150 will now be described.

The backup utility 35 reads data of the data part of each track from the disk device 100 via the operating system 50, the channel interface unit 70, the channel interface unit 71, the channel controller 832, the read processor 835, the CKD disk access unit 837, and the CKD disk interface unit 85, writes the data onto the tape of the tape library 150 via the operating system 50 and the channel interface unit 70, and creates a backup file.

When the backup file is to be restored, the backup utility 35 reads data from the tape library 150, writes the data onto each track on the disk device 100 one after another via the operating system 50, the channel interface unit 70, the channel interface unit 71, the channel controller 832, the write processor 836, the CKD disk access unit 837, and the CKD disk interface unit 85 to restore the file existing on the disk device 100. At the beginning of the above described processing of the backup utility 35, the operating system 50 accesses the standard volume label and the VTOC on the disk device 100.

By the configuration heretofore described and execution of the control program 83, the disk device 100 looks like a volume storing typical CKD records and managed by the operating system 50 when viewed from the backup utility 35 and the operating system 50 of the CPU 11 side, and looks like a volume storing FBA records and managed by the operating system 40 when viewed from the application program 20 and the operating system 40 of the CPU 10 side.

In the first embodiment, the standard volume label was written onto the cylinder 0, track 0 of the disk device 100, and the VTOC was written onto the cylinder 0, track 1. However, this is a promise among the operating system 50, the read processor 833, and the write processor 834. Since the storage area is not seen from the application program 20 and the operating system 40, the first embodiment is not restricted to this.

Furthermore, in the first embodiment, the disk device 100 had no key parts, and data of one record were written per track. However, this is also the configuration which is not seen from the application program 20 and the operating system 40. Therefore, there are no problems even if there is a key part and a plurality of records are written per track. Therefore, the above described conversion equations for converting the LBA to the CCHHR are not restrictive.

It should be noted in the first embodiment one record of 32 KB is set per track of the data part. Thereby the data part becomes an integer times the block length of the FBA data, and the above described conversion equations become equations which can be calculated easily. In addition, the effective data transfer rate between the disk device 110 and the CPU 11 conducted by the backup utility 35 is quickened.

As for the SCSI interface unit 60 and the SCSI interface unit 61, not only the SCSI interface but also an interface following an arbitrary fixed sized blocked record format is possible. As for the operating system 50, an arbitrary operating system supporting this count key data format is possible.

As for the disk device 100 and the disk device 101, they are not restricted to disk devices, but any storage devices can be used so long as they are accessed by using the CCHHR and they store information of the CKD format. Therefore, the disk controller 80 generally becomes a storage controller. Since the tape library 150 is a device for acquiring backup files of the disk device 100, the tape library is not restricted to a tape device, but an arbitrary storage device capable of accomplishing this object can be used.

Figure 6:
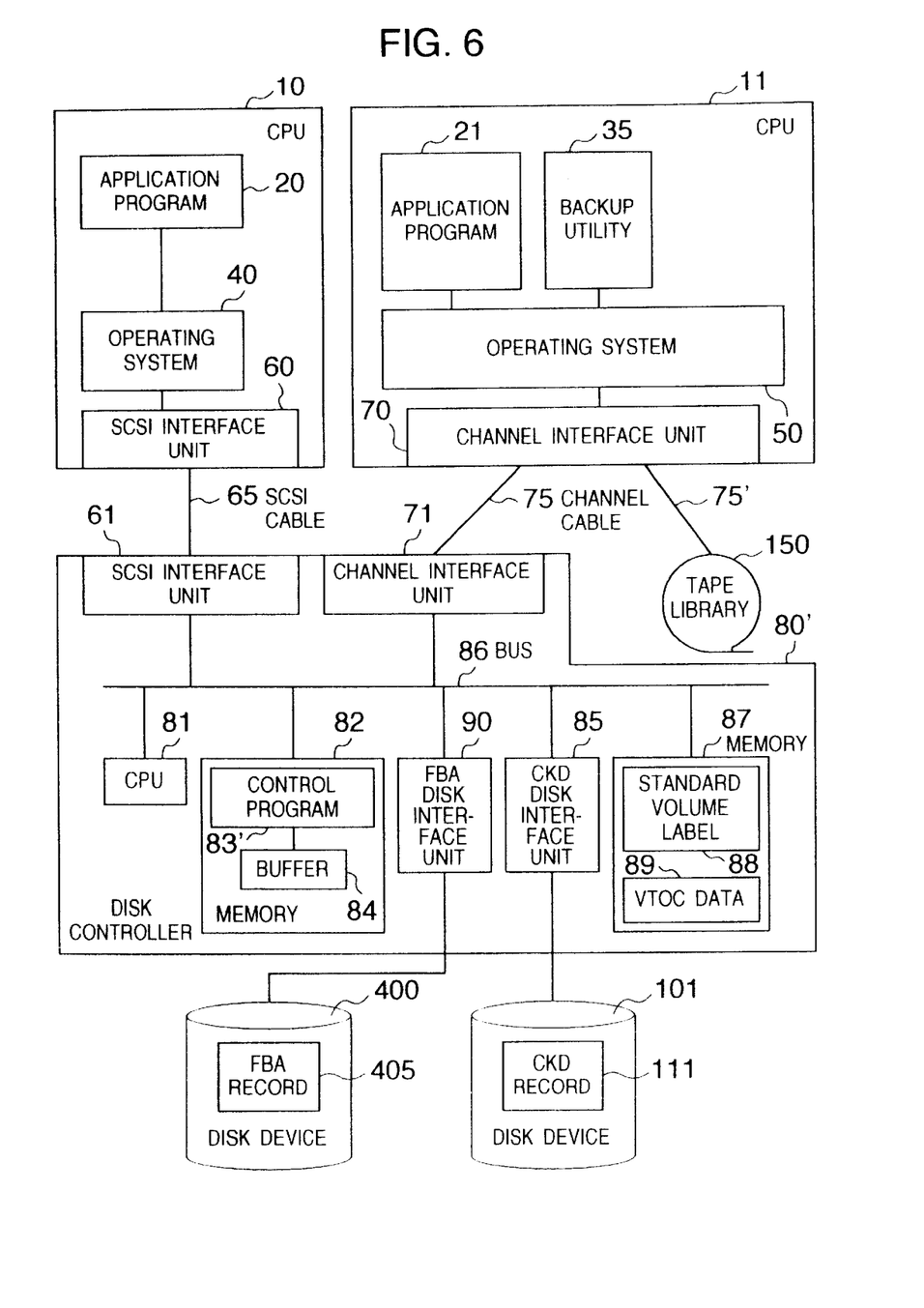
FIG. 6 is a configuration diagram of a computer system of a second embodiment.

FIG. 6 is a configuration diagram of a computer system of a second embodiment. The second embodiment differs from the first embodiment in disappearance of the disk initialization utility 30, installation of a disk device 400 instead of the disk device 100, additional connection of a memory 87 to the bus 86, additional connection of a FBA disk interface (IF) unit 90 to the bus 86 and the disk device 400, and a change from processing of the control program 83 to a control program 83'. The function and operation of other components denoted by like numerals are the same as those of the first embodiment.

The disk device 400 stores FBA records 405 recorded in the FBA format. The disk device 400 is a disk device shared by the CPU 10 and the CPU 11. The memory 87 of the disk controller 80' is formed by a rewritable RAM (Random Access Memory). The memory 87 stores standard volume labels 86 and VTOC data 89. The FBA disk interface unit 90 is hardware for conducting data transfer between the disk device 400 and the bus 86.

The content of the standard volume label 88 is information indicating that the VTOC begins from the first record of cylinder 0, track 1. The VTOC data 89 has information indicating that one sequential dataset having a size equivalent to full capacity of the volume (disk device 400 in this case) exists and there are no free areas, and indicating that the sequential dataset is formed by records of fixed-sized nonblock record format each having a record length of 32 Kbytes. In the case where there are a plurality of disk devices 400, common standard volume label 88 and VTOC data 89 may be used if the standard volume label 88 and the VTOC data 89 are fixed for all disk devices 400. Alternatively, one set of standard volume label 88 and the VTOC data 89 may be provided so as to correspond to each of the disk devices 400. In other words, information required for the disk device 400 to look like a disk device storing data of CKD format when seen from the CPU 11 is stored in the memory 87.

The application program 20 writes the FBA record 405 onto the disk device 400 via the operating system 40, the SCSI interface unit 60, the SCSI interface unit 61, the control program 83', and the FBA disk interface unit 90, and reads the FBA record 405 from the disk device 400 via the same mechanism units. Its control scheme is the same as that in the case where the FBA record is read/written via the conventional SCSI interface.

The application program 21 writes the CKD record 111 onto the disk device 101 via the operating system 50, the channel interface unit 70, the channel interface unit 71, the control program 83', and the CKD disk interface unit 85, and reads the CKD record 111 from the disk device 101 via the same mechanism units. Its control scheme is the same as that in the case where the CKD record is read/written via the conventional channel interface.

Figure 7:
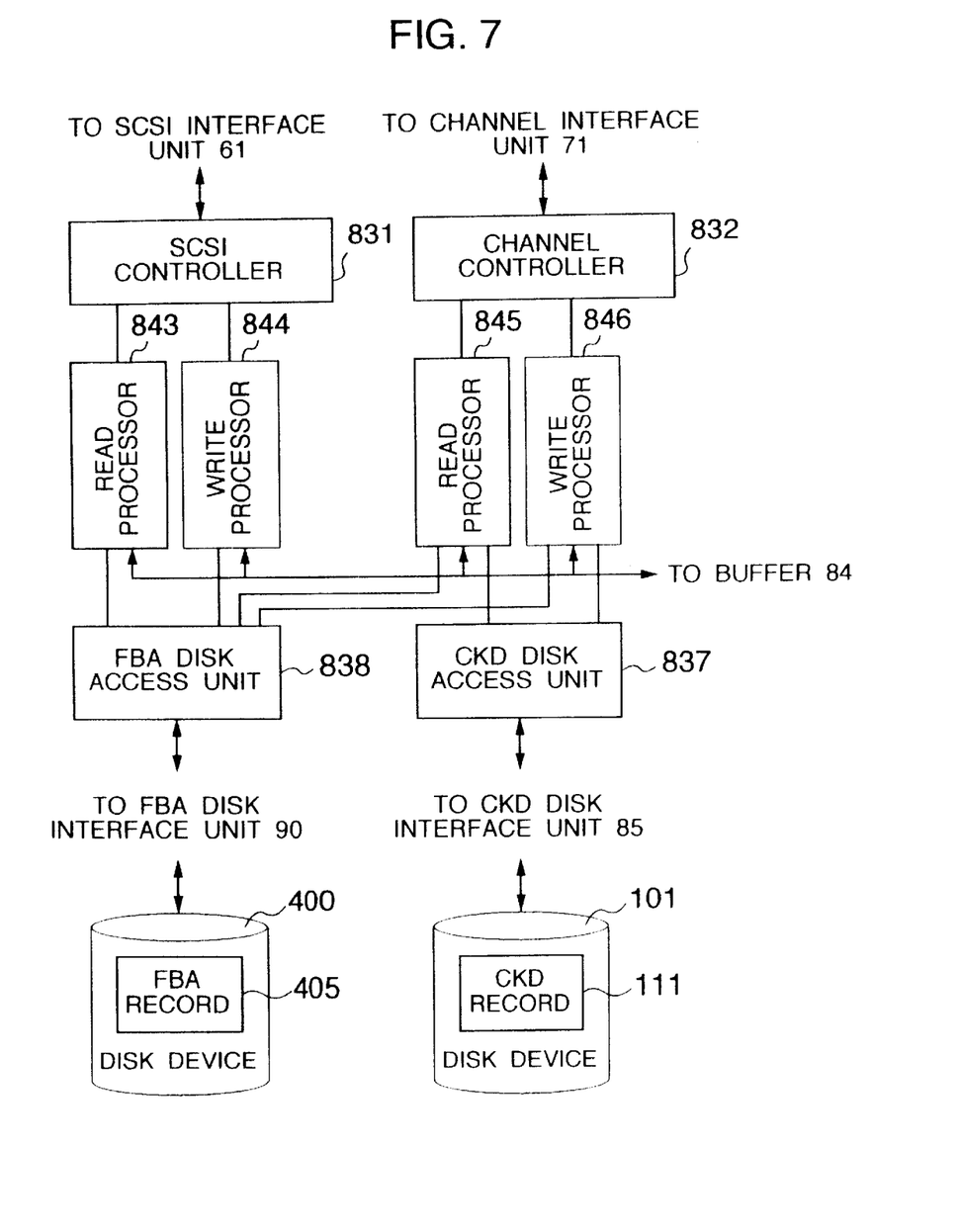
FIG. 7 is a more detailed configuration diagram of a control program 83' of the second embodiment.

FIG. 7 is a more detailed configuration diagram of the control program 83'. A SCSI controller 831 is a controller for interpreting a command inputted from the CPU 10 via the SCSI interface unit 61, delivering the control to a read processor 843 or a write processor 844, and controlling data transfer between the SCSI interface unit 61 and the buffer 84. A FBA disk access unit 838 is a controller for driving the FBA disk interface unit 90 to access the disk device 400. The read processor 843 and the write processor 844 conducts conventional FBA record reading/writing via the buffer 84 and a FBA disk access unit 838.

A channel controller 832 is a controller for interpreting a command inputted from the CPU 11 via the channel interface unit 71, delivering the control to a read processor 845 or a write processor 846, and controlling the data transfer between the channel interface unit 71 and the buffer 84. A CKD disk access unit 837 is a controller for driving the CKD disk interface unit 85 to access the disk device 101.

The read processor 845 is a processor driven when a read command is inputted from the CPU 11. When a read request specifying the disk device 400 by using the CCHHR is inputted from the CPU 11 and the read command specifies cylinder 0, track 0 or cylinder 0, track 1 as the CCHHR, the read processor 845 reads contents of the standard volume label 88 or the VTOC data 89 included in the memory 87, and transfers them toward the CPU 11. When a read request specifying the disk device 400 by using the CCHHR is inputted from the CPU 11 and the read command specifies cylinder 0, track 2 or larger than 2 as the CCHHR, the read processor 845 converts a record address specified by the CCHHR to a block address specified by a LBA, reads the FBA record 405 from the disk device 400 into the buffer 84 via the FBA disk access unit 838, adds the count part to that FBA record, and transfers data toward the CPU 11.

The write processor 846 is a processor driven when a write command is inputted from the CPU 11. When a write request specifying the disk device 400 by using the CCHHR is inputted from the CPU 11 and the write command specifies cylinder 0, track 0 or cylinder 0, track 1 as the CCHHR, the write processor 846 writes data transferred from the CPU 11 into the standard volume label 88 or the VTOC data 89 included in the memory 87. When a write request specifying the disk device 400 is inputted from the CPU 11 and the write command specifies cylinder 0, track 2 or larger than 2 as the CCHHR, the write processor 846 converts a record address specified by the CCHHR to a block address specified by a LBA, stores a data record sent from the CPU 11 in the buffer 84, and writes the FBA record 405 onto the disk device 400 via the FBA disk access unit 838.

When a read request or a write request specifying the disk device 101 by using the CCHHR is inputted from the CPU 11, respectively, the read processor 845 or the write processor 846 conducts conventional CKD record reading/writing via the buffer 84 and the CKD disk access unit 837.

In the case of data transfer between the application program 20 and the disk device 400, the SCSI controller 831, the read processor 843 and the write processor 844 are executed, and the FBA disk access unit 838 is driven. In the case of data transfer between the application program 21 and the disk device 101, the channel controller 832, the read processor 845 and the write processor 846 are executed, and the CKD disk access unit 837 is driven.

In the case of data transfer between the tape library 150 and the disk device 400 conducted by the backup utility 35, the channel controller 832, the read processor 845 and the write processor 846 are executed, and the FBA disk access unit 838 is driven. When reading the FBA record 405 from the disk device 400, the backup utility 35 repeatedly issues a "READ TRACK" command and thereby reads the FBA record onto the buffer 84. When writing the FBA record 405 onto the disk device 400, the backup utility 35 repeatedly issues a "WRITE COUNT KEY AND DATA" command and thereby writes the FBA record existing on the buffer 84.

Figure 8:
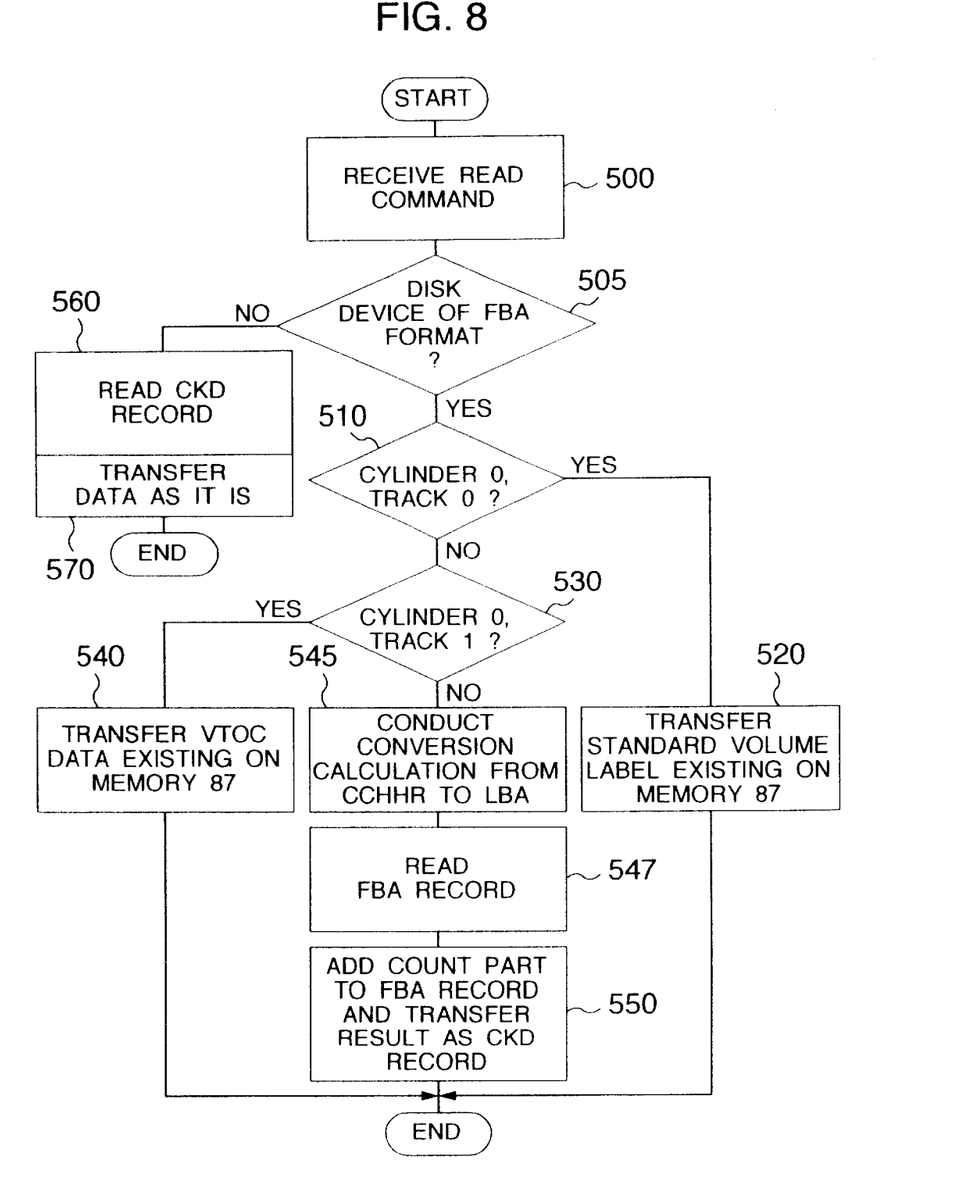
FIG. 8 is a flow chart showing the flow of read processing of the second embodiment conducted by a read processor 845.

FIG. 8 is a flow chart showing the flow of read processing conducted via the channel interface unit 71 by the read processor 845 of the disk controller 80'. Upon receiving the read command in the CCHHR format from the operating system 50 via the channel control unit 832 (step 500), the read processor 845 determines whether the read command is a read command specifying the disk device 400 of the FBA format (step 505). The disk controller 80' holds the device number of the disk device storing the FBA record on the memory 87. By referring to this information, it is determined whether the specified disk device is the disk device 400. When the specified disk device is the disk device 400 (YES of step 505) and the command is a read command specifying cylinder 0, track 0 (YES of step 510), the read processor 845 reads the standard volume label 88 from the memory 87 into the buffer 84, and transfers it to the CPU 11 (step 520). When the specified disk device is the disk device 400 (YES of step 505) and the command is a read command specifying cylinder 0, track 1 (YES of step 530), the read processor 845 reads the VTOC data 89 from the memory 87 into the buffer 84, and transfers it to the CPU 11 (step 540).

When the command is the "READ TRACK" command specifying cylinder 0, track 2 or larger than 2 (NO of step 530), the read processor 845 converts the CCHHR of the inputted command to a LBA (step 545). In the same way as the first embodiment, the start position of the data part of cylinder 0, track 2, record 1 is associated with the head of the data block having a LBA equivalent to 0. Furthermore, each track stores data of 32 KB. The conversion equation is as follows:

$$LBA = \downarrow (\text{cylinder number} \times \text{the number of heads} \times 32\text{ KB} + \text{head number} \times 32\text{ KB} - 64\text{ KB})/\text{block length} \downarrow \quad (4)$$

The meaning of the number of heads and the block length is the same as that of the first embodiment. Subsequently, the read processor 845 reads a FBA record corresponding to the data quantity of 32 KB starting from the converted LBA onto the buffer 84 via the FBA disk access unit 838 (step 547), adds the count part to the head of the data, and transfers the data to the CPU 11 via the channel interface unit 71 (step 550). The count part has 8 bytes: 5 bytes indicating the CCHHR of the records, i.e., the cylinder, track and record numbers, 1 byte indicating the key length, and 2 bytes indicating the data length. In the case of the present embodiment, the key length is fixed to 0, the data length is fixed to 32768, and the record number is fixed to 1. The cylinder number and the track number are the same as the values specified by the "READ TRACK" command.

Unless the read command is a command specifying the disk device 400 (NO of the step 505), the CKD record 111 is read from the disk device 101 onto the buffer 84 via the CKD disk access unit 837 in the same way as the conventional processing (step 560) and the CKD record is transferred as it is to the CPU 11 via the channel interface unit 71 (step 570). As a matter of course, there are not any restrictions on the format of the CKD record 111 on the disk device 101.

The write processor 846 receives a write command from the operating system 50 via the channel controller 832. If the specified disk device is the disk device 400, and the write command specifies cylinder 0, track 0, then the write processor 846 writes a given standard volume label into the standard volume label 88 on the memory 87. If the specified disk device is the disk device 400, and the write command specifies cylinder 0, track 1, then the write processor 846 writes given VTOC data into the VTOC data 89 on the memory 87.

When the command is a "WRITE COUNT KEY AND DATA" command specifying cylinder 0, track 2 or larger than 2 of the disk device 400, the write processor 846 converts the inputted CCHHR to the LBA according to the conversion equation (4), and writes the FBA record 405 starting from the converted LBA and corresponding to the data quantity of 32 KB into the disk device 400 via the FBA disk access unit 838. Information of the count part inputted from the CPU 11 is disregarded.

If the write command is not a write command specifying the disk device 400, the write processor 846 stores the CKD record received from the CPU 11 in the buffer 84 in the same way as the conventional processing, and writes the CKD record into the disk device 101 via the CKD disk access unit 837. The CKD record 111 written into the disk device 101 has the same format as the conventional format.

It is now assumed that the application program 20 and the operating system 40 create a file on the disk device 400 as heretofore described and thereafter the file on the disk device 400 is backed up in the tape library 150. This case will now be described. First of all, the read processor 845 reads the standard volume label 88 and the VTOC data 89 from the memory 87. The operating system 50 writes them into the tape library 150. The backup utility 35 reads each track from the disk device 400 onto the buffer 84 via the operating system 50, the channel interface unit 70, the channel interface unit 71, the channel controller 832, the read processor 845, the FBA disk access unit 838, and the FBA disk interface unit 90. The backup utility 35 writes this CKD data onto tape of the tape library 150 via the operating system 50 and the channel interface unit 70, and thereby creates a backup file.

When restoring the backup file, the operating system 50 accesses the standard volume label 88 and the VTOC data 89 on the memory 87 in processing of the backup utility 35. The backup utility 35 reads the CKD data from the tape library 150, and stores the CKD data onto the buffer 84. The write processor 846 successively writes the CKD data onto the disk device 400 as the FBA record via the FBA disk access unit 838 and the FBA disk interface unit 90, and restores the file existing on the disk device 400.

Owing to the configuration heretofore described and the executed control program 83', the disk device 400 looks like a volume which stores the conventional CKD record and which is managed by the operating system 50 when seen from the backup utility 35 and the operating system 50. The disk device 400 looks like a volume which stores the FBA record and which is managed by the operating system 40 when seen from the application program 20 and the operating system 40.

In the second embodiment, the standard volume label 88 and the VTOC data 89 are stored in the memory 87, and consequently the disk initialization utility 30 for initializing the disk device 400 as shown in FIG. 1 is not necessary. Furthermore, since the contents thereof are fixed, instead of providing the memory 87, the control program 83' may generate them at the time of program execution.

Figure 9:
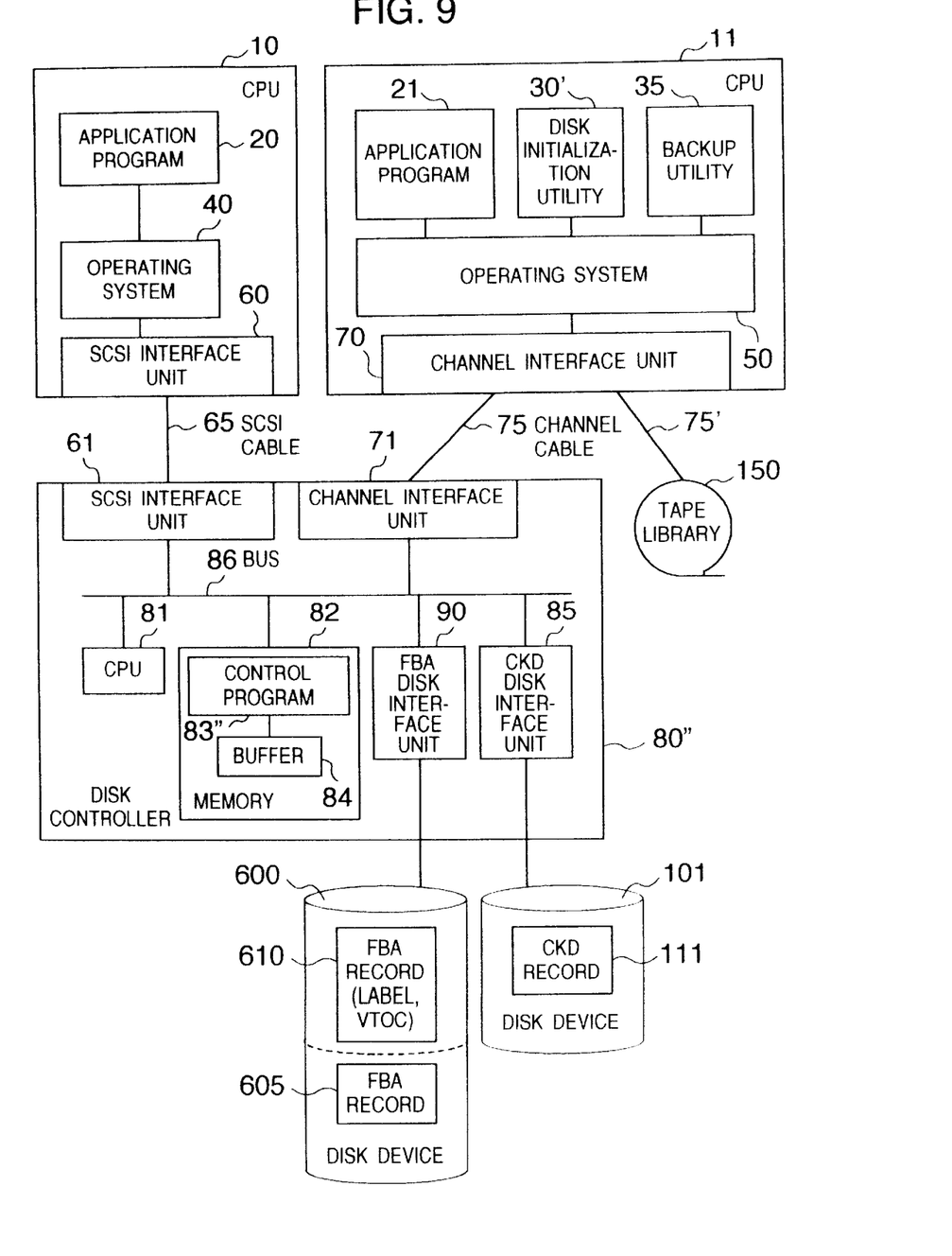
FIG. 9 is a configuration diagram of a computer system of a third embodiment.

FIG. 9 is a configuration diagram of a computer system of a third embodiment. The third embodiment differs from the second embodiment in installation of a disk initialization utility 30' for conducting processing altered from that of the disk initialization utility 30, installation of a disk device 600 instead of the disk device 400, disappearance of the memory 87, and installation of a control program 83" for conducting processing altered from that of the control program 83'. The function and operation of other components denoted by like numerals are the same as those of the second embodiment.

The disk device 600 stores FBA records 605 and FBA records 610 recorded in the FBA format. The disk device 600 is a disk device shared by the CPU 10 and the CPU 11. The FBA record 605 is a record accessed by the application program 20 and the backup utility 35. The FBA record 610 is a record accessed by the operating system 50 when executing the disk initialization utility 30' and the backup utility 35. The FBA record 610 is in an area outside the logical volume accessed by the application program 20 and the operating system 40 in the CPU 10. The FBA record 610 is a record storing a standard volume label and VTOC data required to convert the FBA record 605 to a CKD record. Although in FIG. 9 the FBA record 610 is illustrated above the FBA record 605, the FBA record 610 may be disposed in any area.

The application program 20 writes the FBA record 605 onto the disk device 600 via the operating system 60, the SCSI interface unit 60, the SCSI interface unit 61, the control program 83", and the FBA disk interface unit 90, and reads the FBA record 605 from the disk device 600 via the same mechanism units. Its control scheme is the same as that in the case where the FBA record is read/written via the conventional SCSI interface.

The application program 21 writes the CKD record 111 onto the disk device 101 via the operating system 50, the channel interface unit 70, the channel interface unit 71, the control program 83", and the CKD disk interface unit 85, and reads the CKD record 111 from the disk device 101 via the same mechanism units. Its control scheme is the same as that in the case where the CKD record is read/written via the conventional channel interface.

As a more detailed block diagram of the control program 83", the configuration diagram of the control program 83' shown in FIG. 7 can be applied almost as it is. However, the read processor 843 and the write processor 844 access the FBA record 605 of the disk device 600, but they cannot access the FBA 610. When a read request or a write request specifying the disk device is inputted, and the command is a read command or a write command specifying cylinder 0, track 0 or cylinder 0, track 1, the read processor 845 or the write processor 846 accesses the FBA record 610. When the command is a read command or a write command specifying the disk device 600 and specifying cylinder 0, track 2 or larger than 2, the read processor 845 or the write processor 846 accesses the FBA record 605. The disk device 400 is replaced by the disk 600, and the FBA record 405 is replaced by the FBA record 605.

The disk initialization utility 30' writes a standard volume label to be written onto the cylinder 0, track 0 of the CKD disk device into the FBA disk device 600 as the FBA record 610, and writes a VTOC to be written onto the cylinder 0, track 1 of the CKD disk device into the FBA disk device 600 as the FBA record 610 in the same way. Contents of the standard volume label and the VTOC are the same as those of the first embodiment. Unlike the first embodiment, for the FBA disk device 600, the disk initialization utility 30' does not conduct the processing for initializing the data part of cylinder 0, track 2 and larger than 2 conducted for the CKD disk device.

Figure 10:
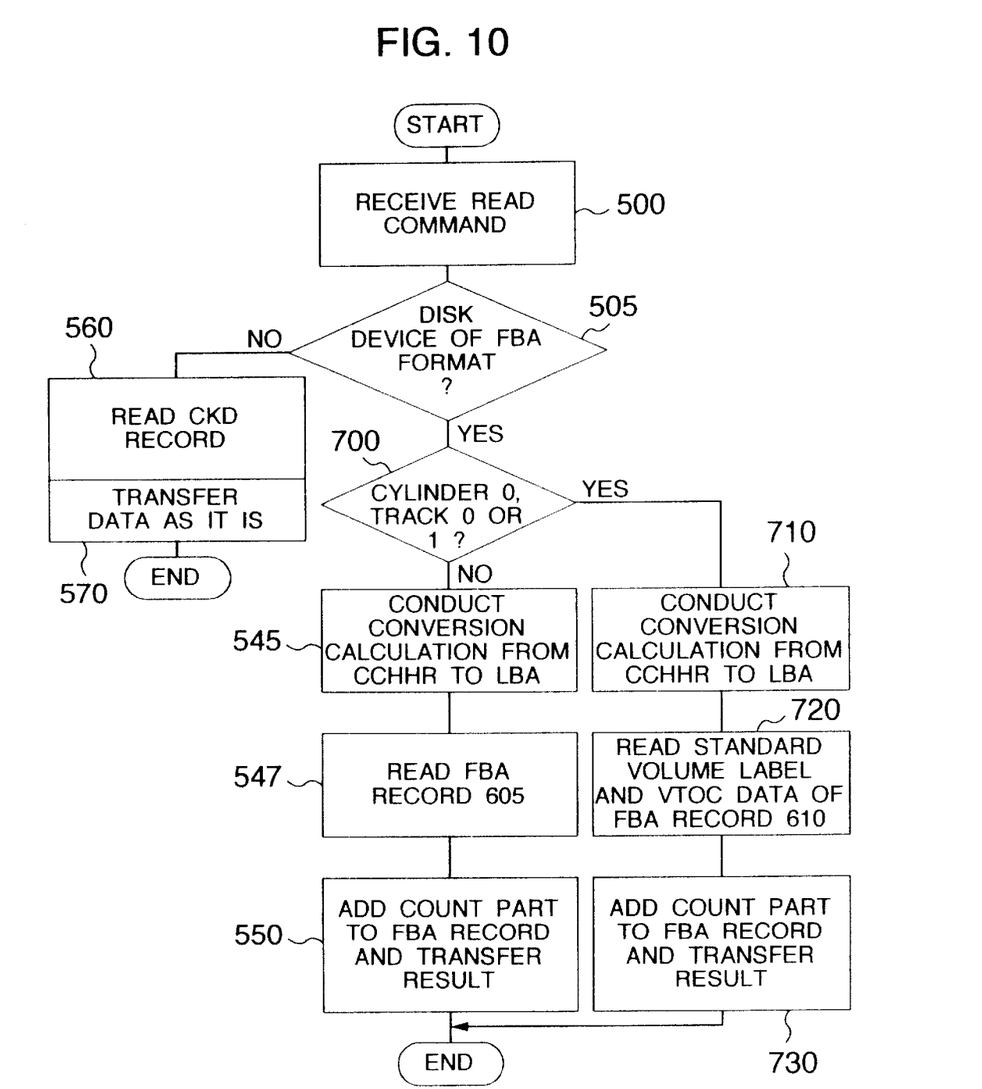
FIG. 10 is a flow chart showing the flow of read processing of the third embodiment conducted by a read processor 845.

FIG. 10 is a flow chart showing the flow of read processing conducted via the channel interface unit 71 by the read processor 845 of the disk controller 80". Upon receiving the read command in the CCHHR form from the operating system 50 via the channel controller 832 (step 500), the read processor 845 (FIG. 7) determines whether the read command is a read command specifying the disk device 600 (step 505). When the specified disk device is the disk device 600 (YES of step 505) and the command is a read command specifying cylinder 0, track 0 or 1 by using the CCHHR (YES of step 700), the read processor 845 converts the CCHHR inputted from the CPU 11 to a LBA located outside the range accessed by the CPU 10 (step 710), reads the FBA record 610 starting from the converted LBA into the buffer 84 (step 720), adds a count part to the head of data, and transfers it to the CPU 11 via the channel interface unit 71 (step 730). The count part has been generated by the read processor 845.

In this way, the standard volume label and the VTOC stored in the FBA record 610 are transferred to the CPU 11. When the command is the "READ TRACK" command specifying cylinder 0, track 2 or larger than 2 of the disk device 600 by using the CCHHR (NO of step 700), the read processor 845 converts the inputted CCHHR to a LBA, reads the FBA record 605, processes the FBA record 605, generates a count part and adds the count part to the FBA record 605, and transfers the resultant data to the CPU 11 in the same way as the second embodiment (steps 545, 547, 550). As for the conversion equation for converting the CCHHR to the LBA, the same equation as the equation (4) of the second embodiment may be used. Unless the read command is a command specifying the FBA disk device 600 (NO of the step 505), the CKD record 111 is read from the disk device 101 and transferred to the CPU 11 in the same way as the second embodiment (steps 560, 570).

The write processor 846 (FIG. 7) receives a write command from the operating system 50 via the channel controller 832. If the disk device specified by using the CCHHR is the disk device 600, and the write command specifies cylinder 0, track 0 or 1 by using the CCHHR, then the write processor 846 conducts the same LBA calculation as the step 710, and writes a standard volume label or VTOC into the FBA record 610. When the command is a "WRITE COUNT KEY AND DATA" command specifying cylinder 0, track 2 or larger than 2 of the disk device 600 by using the CCHHR, the write processor 846 conducts the same LBA calculation as the step 545, and writes the FBA record 605 into the disk device 600. If the write command is not a write command specifying the disk device 600, the write processor 846 stores the CKD record received from the CPU 11 in the buffer 84, writes the CKD record into the disk device 101 via the CKD disk access unit 837.

As heretofore described, the application program 20 and the operating system 40 create a file on the disk device 600. Thereafter in the processing of the backup utility 35, the operating system 50 accesses the standard volume label and the VTOC existing on the FBA record 610, converts them to a standard volume label and a VTOC of the CKD format, and thereafter writes them into the tape library 150. Subsequently, the backup utility 35 reads the FBA record 605 from the disk device 600, converts the FBA record to a CKD record, writes the FBA record into the tape library 150, and creates a backup file. In addition, the backup utility 35 reads the CKD record from the tape library 150, converts the CKD record to a FBA record, writes it into the FBA record 605 of the disk device 600. As a result, the file is restored on the disk device 600.

What is claimed is:

1. In a data storage system including a storage unit, a first interface for performing data transfer complying with count-key-data (CKD) format with a first computer, a second interface for performing data transfer complying with Fixed Block Architecture (FBA) format with a second computer, and a storage control unit, responsive to data access requests from said first and second computers, for controlling data accesses to said storage unit, a data access control method executed by said storage control unit comprising the steps of:

receiving a write request specifying an address complying with said CKD format from said first computer via said first interface;

acquiring an address complying with said FBA format corresponding to said address complying with said CKD format;

storing a data portion, included in a write data accompanying said write request, into said storage unit indicated by said address complying with FBA format and discarding a count portion and a key portion included in said write data accompanying said write request;

receiving a read request specifying an address complying with FBA format to read out data stored in said storage unit from said second computer via said second interface; and transferring said data portion to said second computer via said second interface.

2. A method according to claim 1, further comprising the steps of:

calculating said address complying with said FBA format by using a predetermined formula, wherein said formula comprises said address complying with said CKD format.

3. A data storage system comprising:

a storage unit for storing data shared by first and second computers;

a first interface for performing data transfer complying with CKD format with said first computer;

a second interface for performing data transfer complying with FBA format with said second computer; and a storage control unit, responsive to data access requests from said first and second computers, for controlling data accesses to said storage unit, wherein said storage control unit comprises:

a first unit, responsive to a write request specifying an address complying with said CKD format received via said first interface, for acquiring an address complying with said CKD format corresponding to an address complying with said FBA format, storing a data portion in said FBA format accompanying said write request, and discarding a count portion and a key portion included in said write data accompanying said write request, a second unit, responsive to a read request specifying an address complying with said FBA format received via said second interface, for reading out a data portion by using an address complying with said FBA format thus acquired, and a third unit for transferring said data portion to said second computer via said second interface.

4. A data storage system according to claim 3, further comprising:

a memory for previously storing dataset management information necessary for said first computer to access to said storage unit; and transfer means, responsive to reception from said first computer of a write request specifying a predetermined address in said CKD format, for transferring said dataset management information to said first computer.

* * * * *